(12) United States Patent
Wang et al.

(10) Patent No.: US 8,324,880 B2
(45) Date of Patent: Dec. 4, 2012

(54) POWER CONVERTING SYSTEM WITH FUNCTION OF REDUCING DEAD-TIME

(75) Inventors: Wei Wang, Taipei County (TW); Chien-Hung Kuo, Taipei (TW); Chun Chang, Taipei (TW)

(73) Assignee: Princeton Technology Corporation, Xindian Dist., New Taipei (TW)

( * ) Notice: Subject to any disclaimer, the term of this patent is extended or adjusted under 35 U.S.C. 154(b) by 384 days.

(21) Appl. No.: 12/829,399

(22) Filed: Jul. 2, 2010

(65) Prior Publication Data
US 2011/0012577 A1    Jan. 20, 2011

(30) Foreign Application Priority Data

Jul. 16, 2009  (TW) ............................... 98124083 A

(51) Int. Cl.
*G05F 1/00* (2006.01)
(52) U.S. Cl. .................... 323/285; 323/271; 323/283
(58) Field of Classification Search .................. 323/241, 323/271, 283–287
See application file for complete search history.

(56) References Cited

U.S. PATENT DOCUMENTS

| 5,414,341 A * | 5/1995 | Brown | 323/268 |
| 6,661,208 B2 * | 12/2003 | Rutter et al. | 323/224 |
| 7,135,844 B2 * | 11/2006 | Hane et al. | 323/283 |
| 2005/0212502 A1 * | 9/2005 | Casey et al. | 323/284 |

* cited by examiner

*Primary Examiner* — Adolf Berhane
*Assistant Examiner* — Gary Nash
(74) *Attorney, Agent, or Firm* — Winston Hsu; Scott Margo

(57) ABSTRACT

A driving circuit includes a dead-time detecting circuit, a duty-cycle controlling circuit, and a switch controlling circuit. The dead-time detecting circuit is coupled to an output of a power switch set for detecting a switching voltage on the output of the power switch set and accordingly outputting a dead-time detecting signal. The output of the power switch set is coupled to the first end of an inductive load, and the second end of the inductive load provides an output voltage. The duty-cycle controlling circuit is coupled to the second end of the inductive load for generating a set/reset signal according to the output voltage. The switch controlling circuit controls the power switch set to be away from a dead state according to the set/reset signal and the dead-time detecting signal.

16 Claims, 8 Drawing Sheets

US 8,324,880 B2

POWER CONVERTING SYSTEM WITH FUNCTION OF REDUCING DEAD-TIME

BACKGROUND OF THE INVENTION

1. Field of the Invention

The present invention relates to a power converting system, and more particularly, to a power converting system with function of reducing the dead-time.

2. Description of the Prior Art

In the PWM/PFM circuit, controlling the dead-time is very important. In the prior art, the dead-time generator is composed only of logic gates so that the generated dead-time is easily affected by the fabrication or the temperature. If the generated dead-time is too short, then the power switches of the output-stage circuit of the PWM/PFM circuit may be simultaneously turned-on, generating the large current, causing the power switches overheated and even broken-down. If the generated dead-time is too long, the efficiency of the PWM/PFM circuit is reduced. Therefore, in design for the PWM/PFM circuit, the dead-time has to be properly designed and steadily controlled.

SUMMARY OF THE INVENTION

The present invention provides a driving circuit with function of reducing dead-time. The driving circuit comprises a dead-time detecting circuit, a duty-cycle controlling circuit, and a switch-controlling circuit. The dead-time detecting circuit is coupled to an output of a power switch set for detecting a switching voltage on the output of the power switch set and accordingly generating a dead-time detecting signal. The output of the power switch set is coupled to a first end of an inductive load. A second end of the inductive load provides an output voltage. The duty-cycle controlling circuit is coupled to the second end of the inductive load. The duty-cycle controlling circuit is utilized for generating a set/reset signal according to the output voltage. The switch-controlling circuit is utilized for changing the state of the power switch set from a dead-time state according to the set/reset signal and the dead-timed detecting signal.

The present invention further provides a power converting system with function of reducing dead-time. The power converting system comprises a power switch set, a dead-time detecting circuit, a duty-cycle controlling circuit, and a switch-controlling circuit. The power switch set is coupled to an inductive load. The power switch set has a first power switch and a second power switch. The power switch set is controlled to be away from a dead-time state according to a first switch-driving signal and a second switch-driving signal. The dead-time detecting circuit is coupled to a first end of the inductive load. The dead-time detecting circuit is utilized for detecting a switch voltage on the first end of the inductive load and accordingly generating a dead-time detecting signal. The duty-cycle controlling circuit is coupled to a second end of the inductive load. The duty-cycle controlling circuit is utilized for generating a set/reset signal according to an output voltage of the power converting system. The switch-controlling circuit is utilized for generating the first switch-controlling signal and the second switch-controlling signal according to the set/reset signal and the dead-time detecting signal.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a power converting system capable of determining if the power converting system is in a dead-time state. When the power converting system is in the dead-time state, the corresponding power switch is turned on in time for reducing the dead-time and improving the efficiency.

Figure 1:
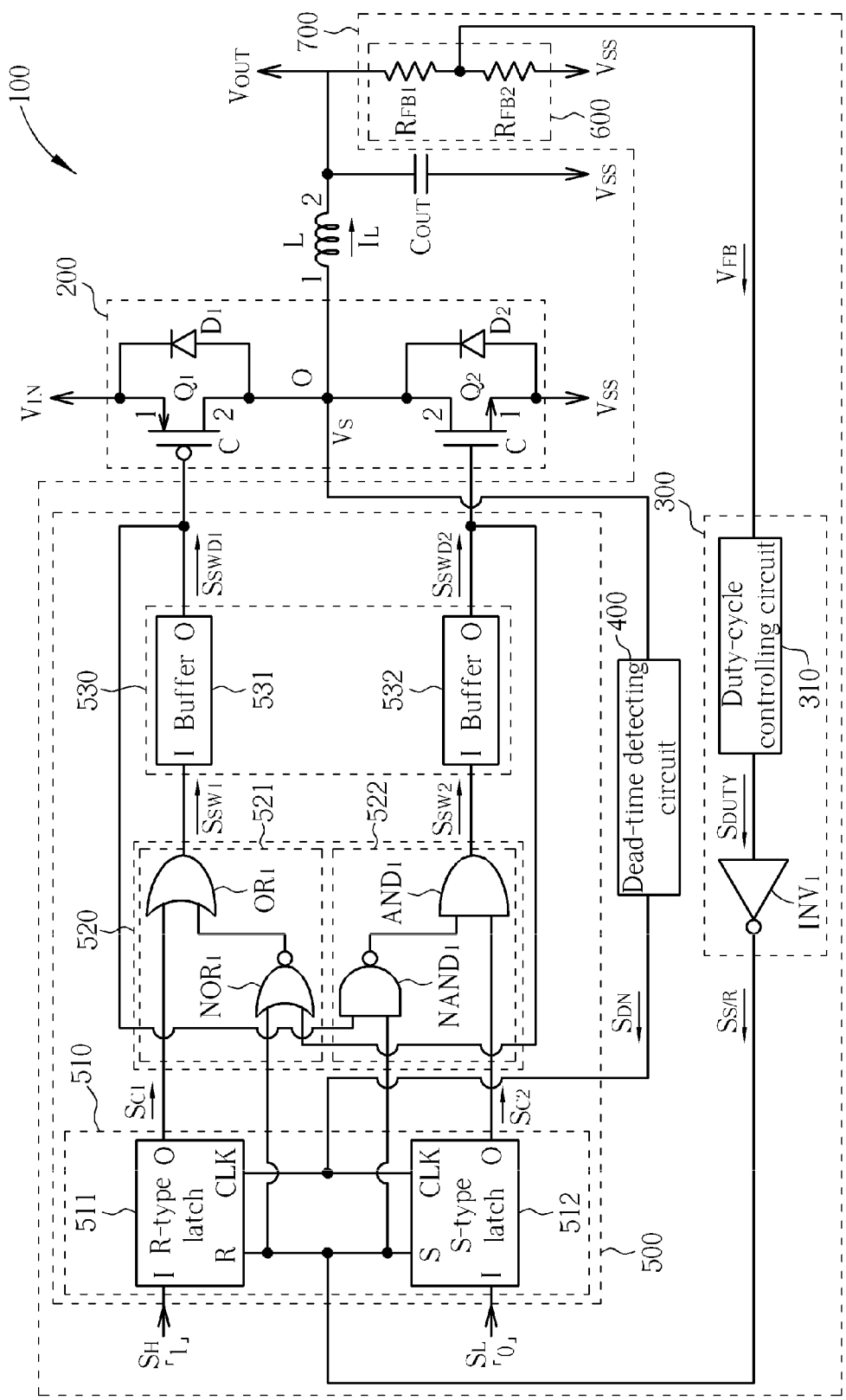
FIG. 1 is a diagram illustrating a power converting system according to a preferred embodiment of the present invention.

Please refer to FIG. 1. FIG. 1 is a diagram illustrating a power converting system 100 according to a preferred embodiment of the present invention. The power converting system 100 can be determined to operate in a Continuous Current Mode (CCM) or in a Discontinuous Current Mode (DCM) for converting an input voltage source $V_{IN}$ into an output voltage source $V_{OUT}$. The power converting system 100 comprises a driving circuit 700, a power switch set 200, an inductive load L, and an output capacitor $C_{OUT}$. The power switch set 200 comprises power switches $Q_1$ and $Q_2$. In the power converting system 100, the power switch set 200 can be treated as a PWM/PFM circuit. The power switch $Q_1$ can be a P channel Metal Oxide Semiconductor (PMOS) transistor, and $D_1$ is a parasitic diode of the power switch $Q_1$; the power switch $Q_2$ can be an N channel Metal Oxide Semiconductor (NMOS) transistor, and $D_2$ is a parasitic diode of the power switch $Q_2$. When the power switch $Q_1$ is turned on and the power switch $Q_2$ is turned off, the input voltage source $V_{IN}$ charges the output capacitor $C_{OUT}$ through the power switch $Q_1$ and the inductive load L so that the output voltage $V_{OUT}$ rises; when the power switch $Q_1$ is turned off and the power switch $Q_2$ is turned on, the voltage polarity of the inductive load L reverses so that the output voltage $V_{OUT}$ falls, wherein when the power switch is turned off, the inductive load L drains a current from the voltage source $V_{SS}$ through the power switch $Q_2$ and the parasitic diode $D_2$ for maintaining the current passing through the inductive load L and providing the current to the output capacitor so as to slow down the speed of the output voltage $V_{OUT}$ falling. In the above-mentioned situation, the inductive load L is in a discharging state. In this way, the output voltage $V_{OUT}$ can be repeatedly controlled to rise/fall for the output voltage $V_{OUT}$ keeping at a predetermined voltage level by means of controlling on/off states of the power switches $Q_1$ and $Q_2$.

The driving circuit 700 is utilized for controlling on/off states of the power switches $Q_1$ and $Q_2$ according to the output voltage $V_{OUT}$ and a switching voltage $V_S$ on an output O of the power switch set 200. In addition, for avoiding turning on the power switches $Q_1$ and $Q_2$ at the same time, the driving circuit 700 simultaneously turns off the power switches $Q_1$ and $Q_2$ for a predetermined period so that the power switch set 200 (or the PWM/PFM circuit) enters the dead-time state (which means the power switch set 200 is in the dead-time state). For example, when the power switch $Q_1$ is turned off and the power switches is not turned on in time, the above-mentioned circuit enters the dead-time state. Meanwhile, since the current passing through the inductive load L has to be continuous because of the characteristic of the inductive load L, the inductive load L generates a reverse electromotive force so that the voltage level of the switching voltage $V_S$ of the output O of the power switch set 200 is lower than the voltage source $V_{SS}$, causing the parasitic diode $D_2$ of the power switch $Q_2$ to be turned on, generating the discharging path consequently.

The driving circuit 700 comprises a duty-cycle controlling circuit 300, a dead-time detecting circuit 400, a switch-controlling circuit 500 and a voltage divider 600.

The voltage divider 600 is utilized for dividing the output voltage $V_{OUT}$ so as to generate a feedback voltage $V_{FB}$, and the voltage divider 600 comprises two feedback resistors $R_{FB1}$ and $R_{FB2}$.

The duty-cycle controlling circuit 300 comprises a duty-cycle controller 310 and an inverter $INV_1$. When the duty-cycle controlling circuit 300 determines the voltage level of the feedback voltage $V_{FB}$ is so high that the duty-cycle controlling circuit 300 is to lower down the output voltage $V_{OUT}$, the duty-cycle controller 310 outputs a duty-cycle controlling signal $S_{DUTY}$ representing "reducing" (low voltage level) so that the inverter $INV_1$ generates a set/reset signal $S_{S/R}$ representing "resetting" (high voltage level); when the duty-cycle controlling circuit 300 determines the voltage level of the feedback voltage $V_{FB}$ is so low that the duty-cycle controlling circuit 300 is to raise up the output voltage $V_{OUT}$, the duty-cycle controller 310 outputs the duty-cycle controlling signal representing "raising" (high voltage level) so that the inverter $INV_1$ generates the set/reset signal $S_{S/R}$ representing "setting" (low voltage level).

The dead-time detecting circuit 400 is utilized for generating a dead-time detecting signal $S_{DN}$ according to the switching voltage $V_S$ on the output O of the power switch set 200.

The switch-controlling circuit 500 is utilized for generating switch-driving signals $S_{SWD1}$ and $S_{SWD2}$ according to the set/reset signal $S_{S/R}$ and the dead-time detecting signal $S_{DN}$ so as to respectively control the power switches $Q_1$ and $Q_2$ of the power switch set 200 to be turned on/off. The switch-controlling circuit 500 comprises a latch circuit 510, a logic-calculating module 520, and a buffer circuit 520. The latch circuit 510 comprises an R-type latch 511, and an S-type latch 512. The logic-calculating module 520 comprises logic-calculating circuits 521 and 522. The buffer circuit 530 comprises buffers 531 and 532.

The R-type latch 511 is utilized for outputting a control signal $S_{C1}$ according to a logic signal $S_H$, the set/reset signal $S_{S/R}$, and the dead-time detecting signal $S_{DN}$. The R-type latch 511 comprises an input end I, a reset end R, a clock-control end CLK, and an output end O. The logic signal $S_H$ inputted to the input end I of the R-type latch 511 is determined to always represent the logic "1" (high voltage level). The reset end R of the R-type latch 511 is utilized for receiving the set/reset signals $S_{S/R}$; the clock-control end CLK of the R-type latch 511 is utilized for receiving the dead-time detecting signals $S_{DN}$; the output end O of the R-type latch 511 is utilized for outputting the control signal $S_{C1}$. The R-type latch 511 is a latch with reset function. That is, when the reset end R of the R-type latch 511 receives a signal of high voltage level, the control signal $S_{C1}$ outputted by the R-type latch 511 is reset to be the logic "0" (low voltage level). Moreover, when the set/reset signal $S_{S/R}$ represents "resetting" (high voltage level), the control signal $S_{C1}$ represents the logic "0" (low voltage level); when the set/reset signal $S_{S/R}$ represents "setting" and the dead-time detecting signal $S_{DN}$ represents "turning-off", the control signal $S_{C1}$ remains unchanged (keeps the previous logic); when the set/reset signal $S_{S/R}$ represents "setting" and the dead-time detecting signal $S_{DN}$ represents "turning-on", the control signal $S_{C1}$ becomes representing the logic "1".

The S-type latch 512 is utilized for outputting a control signal $S_{C2}$ according to a logic signal $S_L$, the set/reset signal $S_{S/R}$, and the dead-time detecting signal $S_{DN}$. The S-type latch comprises an input end I, a set end S, a clock-control end CLK, and an output end O. The logic signal $S_L$ inputted to the input end I of the S-type latch 512 is determined to always represent the logic "0" (low voltage level). The set end S of the S-type latch 512 is utilized for receiving the set/reset signals $S_{S/R}$; the clock-control end CLK of the S-type latch 512 is utilized for receiving the dead-time detecting signals $S_{DN}$; the output end O of the S-type latch 512 is utilized for outputting the control signal $S_{C2}$. The S-type latch 512 is a latch with set function. That is, when the set end S of the S-type latch 512 receives a signal of low voltage level, the control signal $S_{C2}$ outputted by the S-type latch 512 is set to be the logic "1" (high voltage level). Furthermore, when the set/reset signal $S_{S/R}$ represents "setting" (low voltage level), the control signal $S_{C2}$ represents the logic "1" (high voltage level); when the set/reset signal $S_{S/R}$ represents "resetting" and the dead-time detecting signal $S_{DN}$ represents "turning-off", the control signal $S_{C2}$ remains unchanged (keeps the previous logic); when the set/reset signal $S_{S/R}$ represents "resetting" and the dead-time detecting signal $S_{DN}$ represents "turning-on", the control signal $S_{C2}$ becomes representing the logic "0".

The logic-calculating circuit 521 comprises a NOR gate $NOR_1$, and an OR gate $OR_1$. When the control signal $S_{C1}$ represents the logic "1", the OR gate $OR_1$ outputs a switch signal $S_{SW1}$ representing the logic "1"; when the control signal $S_{C1}$ represents the logic "0", the logic of the output signal of the OR gate $OR_1$ is determined by the output signal of the NOR gate $NOR_1$. If the set/reset signal $S_{S/R}$ represents "setting" (low voltage level) and the switch-controlling signal $S_{SWD2}$ represents "turning-off" (low voltage level), the signal outputted by the NOR gate $NOR_1$ is at the high voltage level. As a result, the logic-calculating circuit 521 outputs the switch signal $S_{SW1}$ representing the logic "1" at the time; otherwise, If the set/reset signal $S_{S/R}$ represents "resetting" (high voltage level) or the switch-controlling signal $S_{SWD2}$ represents "turning-on" (high voltage level), the signal outputted by the NOR gate $NOR_1$ is at the low voltage level. Therefore, the logic-calculating circuit 521 outputs the switch signal $S_{SW1}$ representing the logic "0" at the time.

The logic-calculating circuit 522 comprises a NAND gate $NAND_1$, and an AND gate $AND_1$. When the control signal $S_{C2}$ represents the logic "0", the AND gate $AND_1$ outputs a switch signal $S_{SW2}$ representing the logic "0"; when the control signal $S_{C2}$ represents the logic "1", the logic of the output signal of the AND gate $AND_1$ is determined by the output signal of the NAND gate $NAND_1$. If the set/reset signal $S_{S/R}$ represents "resetting" (high voltage level) and the switch-controlling signal $S_{SWD1}$ represents "turning-off" (high voltage level), the signal outputted by the NAND gate $NAND_1$ is at the low voltage level. The logic-calculating circuit 522 outputs the switch signal $S_{SW2}$ representing the logic "0" at the time; otherwise, If the set/reset signal $S_{S/R}$ represents "setting" (low voltage level) or the switch-controlling signal $S_{SWD1}$ represents "turning-on" (low voltage level), the signal outputted by the NAND gate $NAND_1$ is at the high voltage level. Thus, the logic-calculating circuit 521 outputs the switch signal $S_{SW2}$ representing the logic "1" at the time.

The buffers 531 and 532 are utilized for generating the switch-controlling signals $S_{SWD1}$ and $S_{SWD2}$ according to the switch signals $S_{SW1}$ and $S_{SW2}$, respectively. When the switch signal $S_{SW1}$ represents the logic "1", the switch-driving signal $S_{SWD1}$ represents "turning-on". Meanwhile, the switch-driving signal $S_{SWD1}$ is at the low voltage level so that the power switch $Q_1$ is turned on; when the switch signal $S_{SW1}$ represents the logic "0", the switch-driving signal $S_{SWD1}$ represents "turning-off". Meanwhile, the switch-driving signal $S_{SWD1}$ is at the high voltage level so that the power switch $Q_1$ is turned off. When the switch signal $S_{SW2}$ represents the logic "1", the switch-driving signal $S_{SWD2}$ represents "turning-off". Meanwhile, the switch-driving signal $S_{SWD2}$ is at the low voltage level so that the power switch $Q_1$ is turned off; when the switch signal $S_{SW2}$ represents the logic "0", the switch-driving signal $S_{SWD2}$ represents "turning-on". Meanwhile, the switch-driving signal $S_{SWD2}$ is at the high voltage level so that the power switch $Q_2$ is turned on.

Since when the set/reset signal $S_{S/R}$ represents "resetting" (high voltage level), the R-type latch 511 outputs the control signal $S_{C1}$ representing the logic "0" (low voltage level), and the signal outputted by the NOR gate $NOR_1$ is at the low voltage level as well, so that the OR gate $OR_1$ outputs the switch signal $S_{SW1}$ representing the logic "0". In this way, the buffer 531 accordingly generates the switch-driving signal $S_{SWD1}$ representing "turning-off" (high voltage level) so as to turn off the power switch $Q_1$; otherwise, when the set/reset signal $S_{S/R}$ represents "setting" (low voltage level), the S-type latch 512 outputs the control signal $S_{C2}$ representing the logic "1" (high voltage level) and the signal outputted by the NAND gate $NAND_1$ is at the high voltage level as well, so that the AND gate $AND_1$ outputs the switch signal $S_{SW2}$ representing the logic "1". In this way, the buffer 532 accordingly generates the switch-driving signal $S_{SWD2}$ representing "turning-off" (low voltage level) so as to turn off the power switch $Q_2$. Consequently, the power switches $Q_1$ and $Q_2$ can be controlled to be turned off by means of controlling the set/reset signal $S_{S/R}$. In this way, the duty-cycle controlling circuit 300 can detect the magnitude of the output voltage $V_{OUT}$ by means of the feedback voltage $V_{FB}$ for determining the set/reset signal $S_{S/R}$ to represent "setting" or "resetting" so as to turn on/off the power switches $Q_1$ or $Q_2$ through the switch-controlling circuit 500.

The dead-time detecting circuit 400 is utilized for detecting the switching voltage $V_S$ on the output end O of the power switch set 200 (a first end 1 of the inductive load L) and accordingly generating the dead-time detecting signal $S_{DN}$. For instance, it is assumed that the power converting system 100 operates in the CCM mode. When the power switches $Q_1$ and $Q_2$ are both turned off, the power switch set 200 is in the dead-time state at the time. That is, the voltage polarity of the inductive load L reverses so that the inductive load L enters the discharging state and drains a current from the voltage source $V_{SS}$ through the parasitic diode $D_2$ of the power switch $Q_2$. Thus, the voltage level of the switching voltage $V_S$ is equal to the voltage source $V_{SS}$ (for example, 0 volt) deducting the forward voltage $V_{D1}$ (around 0.7 volt) of the parasitic diode $D_2$. As a result, the dead-time detecting circuit 400 outputs the dead-time detecting signal $S_{DN}$ representing "turning-on" (high voltage level); otherwise, when the voltage level of the switching voltage $V_S$ is higher than ($V_{SS}$–$VD_2$), it means the power switch set 200 does not enter the dead-time state (one of the power switches $Q_1$ and $Q_2$ is turned on). Therefore, the dead-time detecting circuit 400 outputs the dead-time detecting signal $S_{DN}$ representing "turning-off" (low voltage level) at the time.

Since when the dead-time detecting signal $S_{DN}$ represents "turning-on", if the set/reset signal $S_{S/R}$ represents "resetting" at the time, the S-type latch 512 outputs the control signal $S_{C2}$ representing the logic "0". In this way, AND gate $AND_1$ outputs the switch signal $S_{SW2}$ representing the logic "0" so that the buffer 532 accordingly outputs the switch-driving signal $S_{SWD2}$ representing "turning-on" for turning on the power switch $Q_2$; otherwise, if the set/reset signal $S_{S/R}$ represents "setting" at the time, the R-type latch 511 outputs the control signal $S_{C1}$ representing the logic "1". In this way, OR gate $OR_1$ outputs the switch signal $S_{SW1}$ representing the logic "1" so that the buffer 531 accordingly outputs the switch-driving signal $S_{SWD1}$ representing "turning-on" to turn on the power switch $Q_1$.

When the set/reset signal $S_{S/R}$ represents "resetting", if the dead-time detecting signal $S_{DN}$ changes from "turning-on" to "turning-off", the R-type latch 511 still outputs the control signal $S_{C1}$ representing the logic "0", and the logic of the control signal $S_{C2}$ outputted by the S-type latch 512 remains unchanged. Hence, when the dead-time detecting signal $S_{DN}$ changes from "turning-on" to "turning-off", the switch-driving signals $S_{SWD1}$ and $S_{SWD2}$ both remain unchanged; when the set/reset signal $S_{S/R}$ represents "setting", if the dead-time detecting signal $S_{DN}$ changes from "turning-on" to "turning-off", the S-type latch 512 still outputs the control signal $S_{C2}$ representing the logic "1", and the logic of the control signal $S_{C1}$ outputted by the R-type latch 511 remains unchanged. Thus, when the dead-time detecting signal $S_{DN}$ changes from "turning-on" to "turning-off", both the switch-driving signals $S_{SWD1}$ and $S_{SWD2}$ remain unchanged. That is, when the dead-time detecting signal $S_{DN}$ changes from "turning-on" to "turning-off", the on/off states of the power switches $Q_1$ and $Q_2$ do not change.

In addition, if the power converting system 100 operates in the DCM mode, when the power switch $Q_2$ remains turned-off and the power switch $Q_1$ changes from turned-on to turned-off so that the power switch set 200 enters the dead-time state, the inductive load L still drains the current from the voltage source $V_{SS}$ through the parasitic diode $D_2$ of the power switch $Q_2$. As a result, the voltage level of the switching voltage $V_S$ is equal to the voltage source $V_{SS}$ (0 volt) deducting the forward voltage $V_{D1}$ (around 0.7 volt) of the parasitic diode $D_2$. As a result, the dead-time detecting circuit 400 outputs the dead-time detecting signal $S_{DN}$ representing "turning-on" (high voltage level) so as to turn on the power switch $Q_2$ in time for the power switch set 200 away from the dead-time state. However, when the power switch $Q_1$ remains turned-off and the power switch $Q_2$ changes from turned-on to turned-off so that the power switch set 200 enters the dead-time state, since the power converting system 100 operates in the DCM mode at the time, the magnitude of the current passing through the inductive load L is reduced to zero. That, the inductive load L does not drain the current from the voltage source $V_{SS}$ through the parasitic diode $D_2$ of the power switch $Q_2$ at the time. In this way, the voltage level of the switching voltage $V_S$ is higher than ($V_{SS}$–$VD_2$). In other words, the dead-time detecting circuit 400 still outputs the dead-time detecting signal $S_{DN}$ representing "turning-off" (low voltage level) at the time. Hence, the states of the power switch set 200 cannot be correctly detected.

However, when the power switch $Q_1$ remains turned-off and the power switch $Q_2$ changes from turned-on to turned-off, it means that the switch-driving signal $S_{SWD2}$ changes from "turning-on" (high voltage level) to "turning-off" (low voltage level) and the set/reset signal $S_{S/R}$ represents "setting" (low voltage level) at the time. Meanwhile, the output logic of NOR gate $NOR_1$ of the logic-calculating module 520 is determined by the switch-driving signal $S_{SWD2}$. Since the switch-driving signal $S_{SWD2}$ changes from "turning-on" (high voltage level) to "turning-off" (low voltage level), the NOR gate $NOR_1$ outputs a high voltage level signal. More particularly, by means of designing the transient voltage of the NOR gate $NOR_1$, when the switch-driving signal $S_{SWD2}$ is lower than the threshold voltage $V_{T2}$ of the power switch $Q_2$, the NOR gate $NOR_1$ can determine that the switch-driving signal $S_{SWD2}$ has already changed from the high voltage level to the low voltage level and the power switch $Q_2$ has already been turned-off. Therefore, the NOR gate $NOR_1$ outputs the high voltage level signal so that the logic-calculating circuit 522 outputs the switch signal $S_{SW1}$ representing the logic "1". In this way, the buffer 531 outputs the switch-driving signal $S_{SWD1}$ representing "turning-on" so as to turn on the power switch $Q_1$ for the power switch set 200 away from the dead-time state.

In summary, in the power converting system 100 of the present invention, the switch-controlling circuit 500 detects the output voltage $V_{OUT}$ by means of the voltage divider 600, and controls the logic of the set/reset signal $S_{S/R}$ for turning on/off the power switches $Q_1$ and $Q_2$ of the power switch set 200 through the duty-cycle controlling circuit 300. If the power converting system 100 of the present invention operates in the CCM mode, when the power switch set 200 enters the dead-time state, the dead-time detecting circuit 400 detects the power switch set 200 in the dead-time state so as to output the dead-time detecting signal $S_{DN}$ representing "turning-on". In this way, the switch-controlling circuit 500 turns on the corresponding power switch (for instance, the power switch $Q_2$) in time because of the dead-time detecting signal $S_{DN}$ representing "turning-on". Besides, if the power converting system 100 of the present invention operates in the DCM mode, when the power switch $Q_2$ remains turned-off and the power switch $Q_1$ changes from turned-on to turned-off, the dead-time detecting circuit 400 still can detect the power switch set 200 in the dead-time state so as to turn on the power switch $Q_2$ in time through the switch control circuit 500; otherwise, when the power switch $Q_1$ remains turned-off and the power switch $Q_2$ changes from turned-on to turned-off, the logic-calculating circuit 522 of the logic-calculating module 520, by means of determining the voltage level of the switch-driving signal $S_{SWD2}$ is lower than the threshold voltage $V_T$ of the power switch $Q_2$ (that is, the power switch $Q_2$ has already been turned off), can output the switch signal $S_{SW1}$ representing the logic "1" for the buffer 531 outputting the switch-driving signal $S_{SWD1}$ so as to turn on the power switch $Q_1$, urging the power switch set 200 to be away from the dead-time state. In this way, no matter the power converting system 100 operates in the CCM mode or in the DCM mode, by means of the dead-time detecting circuit 400 detecting the change of the switching voltage $V_S$ and the logic-calculating module 520 detecting the change of the switch-driving signal $S_{SWD1}$, the power converting system 100 can determine if the power switch set 200 is in the dead-time state so that the switch-controlling circuit 500 can turn on the corresponding power switch in time for the power switch set 200 away from the dead-time state. In this way, the dead-time is reduced, improving the efficiency of the power converting system 100.

Figure 2:
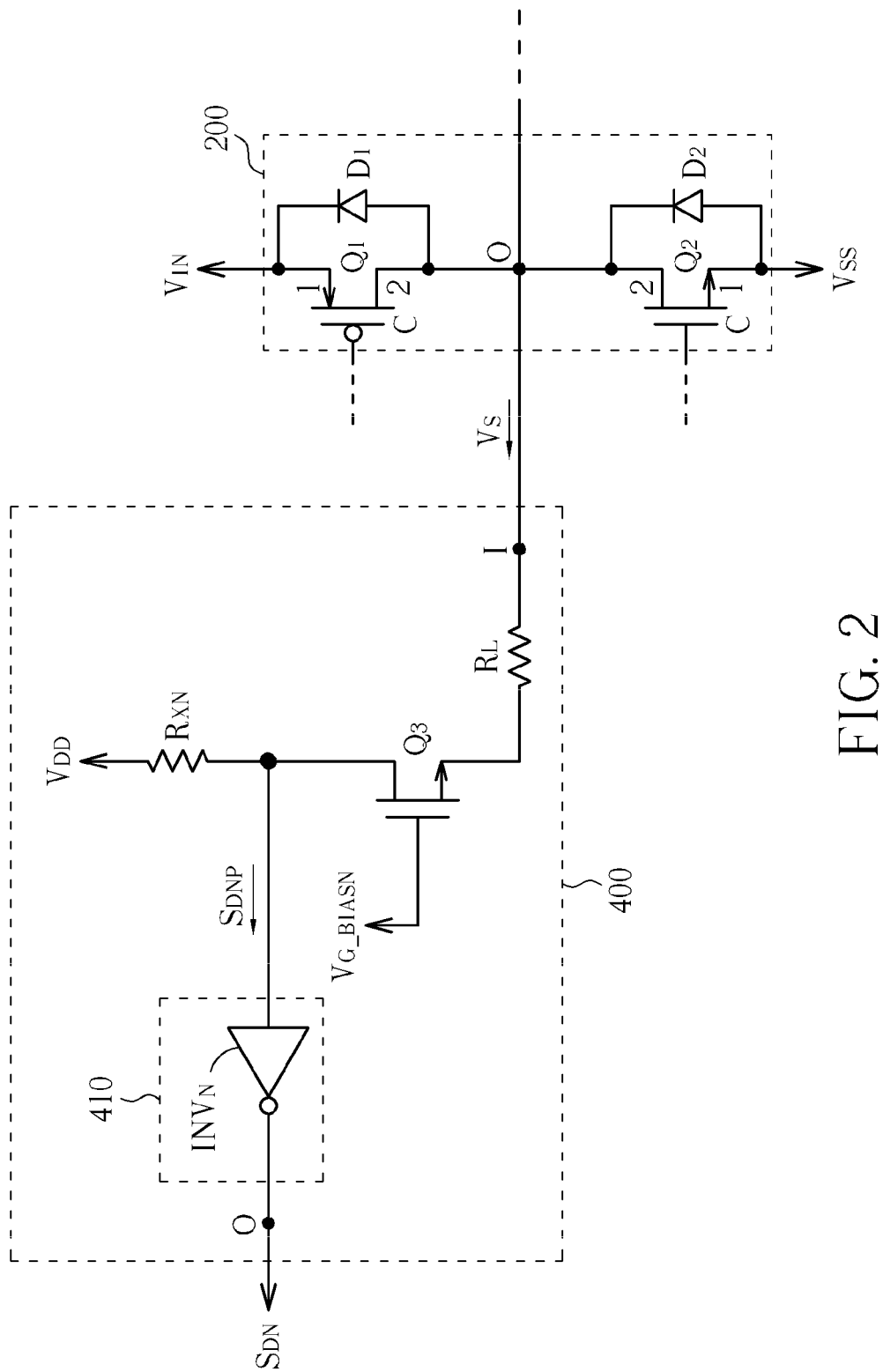
FIG. 2 is a diagram illustrating a dead-time detecting circuit of the present invention.

Please refer to FIG. 2. The dead-time detecting circuit 400 comprises a transistor $Q_3$, two resistors $R_{XN}$ and $R_L$, and a waveform trimmer 410. The transistor $Q_3$ can be an NMOS transistor. The source of the transistor $Q_3$ is coupled to the input end I of the dead-time detecting circuit 400 (the output O of the power switch set 200) for receiving the switching voltage $V_S$; the drain of the transistor $Q_3$ is coupled to the resistor $R_{XN}$, for generating a previous-stage dead-time detecting signal $S_{DNP}$; the gate of the transistor $Q_3$ is utilized for receiving a gate-controlling voltage $V_{G\_BIASN}$. The resistor $R_{XN}$ is coupled between the drain of the transistor $Q_3$ and the voltage source $V_{DD}$ for maintaining the voltage level of the previous-stage dead-time detecting signal $S_{DNP}$ through the voltage source $V_{DD}$ when the transistor $Q_3$ does not generate the previous-stage dead-time detecting signal $S_{DNP}$ representing "turning-on". The resistor $R_L$ is coupled between the source of the transistor $Q_3$ and the output O of the power switch set 200 as a current-limiting resistor, for avoiding the inductive load L discharging too much current to the dead-time detecting circuit 400.

The waveform trimmer 410 is coupled between the drain of the transistor $Q_3$ and the output end O of the dead-time detecting circuit 400, for trimming the waveform of the previous-stage dead-time detecting signal $S_{DNP}$, and accordingly outputting the dead-time detecting signal $S_{DN}$. The waveform trimmer 410 can be realized with an inverter $INV_N$. In addition, assuming that the voltage drop across the current-limiting resistor $R_L$, and the voltage drops across the power switches $Q_1$ and $Q_2$ can be ignored, the gate-controlling voltage $V_{G\_BIASN}$ can be designed as following formulas:

$$(V_{SS}+V_{T3})>V_{G\_BIASN}>V_{T3}+(V_{SS}-V_{D2}) \quad (1), \text{ and}$$

$$V_{GS3} \geq [V_{T3}+(V_{SS}-V_{D2})-V_O];$$

wherein $V_O=V_{SS}-V_{D2}$, and $V_{T3}$ represents the threshold voltage of the transistor $Q_3$, $V_{D2}$ represents the forward voltage of the parasitic diode $D_2$. The operation principle of the dead-time detecting circuit 400 is illustrated as below.

When the switching voltage $V_S$ is higher than $(V_{SS}-V_{D2})$, the gate-source voltage $V_{GS3}$ is not higher than the threshold voltage $V_{T3}$ of the transistor $Q_3$ at the time so that the transistor $Q_3$ is turned off. In this way, the previous-stage dead-time detecting signal $S_{DNP}$ is pulled up to the high voltage level $V_{DD}$ by the voltage source $V_{DD}$ through the resistor $R_{XN}$; the inverter $INV_N$ outputs the dead-time detecting signal $S_{DN}$ representing "turning-off" by inverting the previous-stage dead-time detecting signal $S_{DNP}$, and the dead-time detecting signal $S_{DN}$ is at the low voltage level at the time. When the switching voltage $V_S$ is equal or lowered to $(V_{SS}-VD_2)$, it means that the power switch set 200 is in the dead-time state (both the power switches $Q_1$ and $Q_2$ are turned-off) and the inductive load L is in the discharging state. The voltage level of the gate-source voltage $V_{GS3}$ of the transistor $Q_3$ is $[V_{T3}+(V_{SS}-V_{D2})-V_S]$ at the time. The gate-source voltage $V_{GS3}$ is higher than the threshold voltage $V_{T3}$ of the transistor $Q_3$ at the time so that the transistor $Q_3$ is turned on. In this way, the previous-stage dead-time detecting signal $S_{DNP}$ is pulled down to the low voltage level through the transistor $Q_3$; the inverter $INV_N$ outputs the dead-time detecting signal $S_{DN}$ representing "turning-on" by inverting the previous-stage dead-time detecting signal $S_{DNP}$, and the dead-time detecting signal $S_{DN}$ is at the high voltage level.

Hereinafter, it is assumed that the power switch $Q_1$ changes from turned-on to turned-off and the power switch $Q_2$ is turned-off for further illustrating the operation principle of the dead-time detecting circuit 400.

Figure 3:
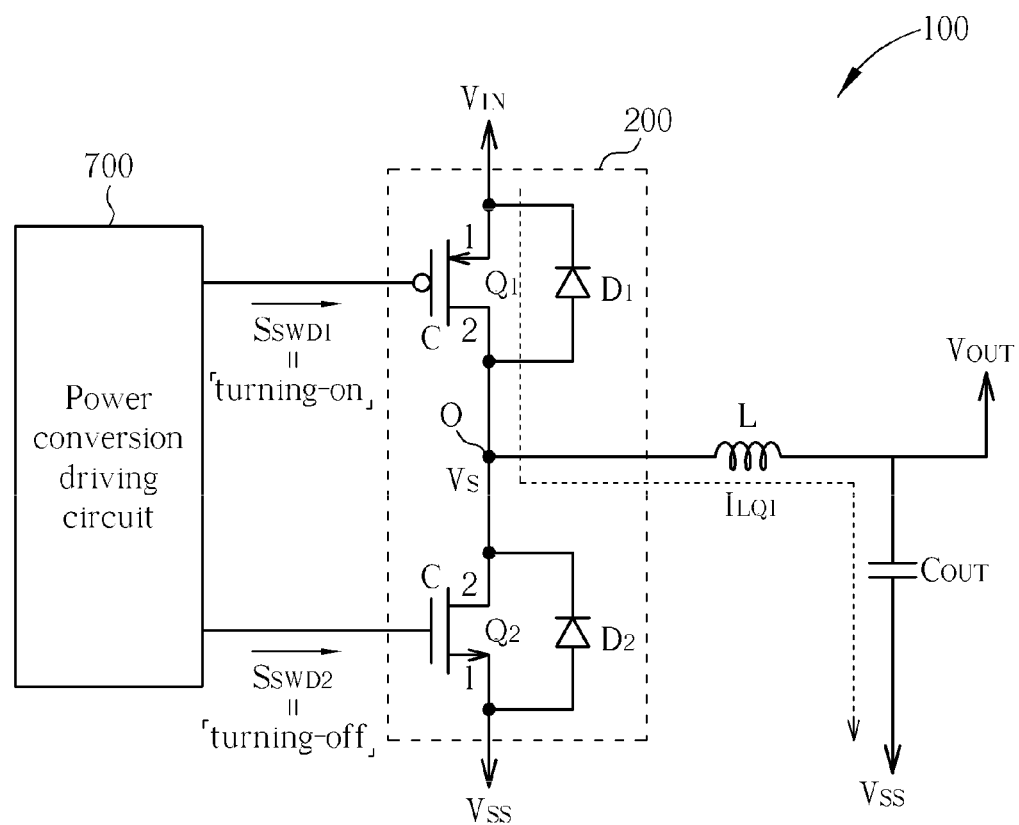
FIG. 3 is a diagram illustrating a current passing through an inductive load of the power converting system when a first power switch is turned-on and a second power switch is turned-off.

Please refer to FIG. 3, a diagram illustrating the current passing through the inductive load L of the power converting system 100 when the power switch $Q_1$ is turned on and the power switch $Q_2$ is turned off. Meanwhile, the switch-driving signal $S_{SWD1}$ represents "turning-on" (low voltage level), and the switch-driving signal $S_{SWD2}$ represents "turning-off" (low voltage level). The input voltage source $V_{IN}$ charges the output capacitor $C_{OUT}$ through the power switch $Q_1$ and the inductive load L so that the output voltage $V_{OUT}$ rises. The voltage level of the switching voltage $V_S$ is between the input voltage $V_{IN}$ and the output voltage $V_{OUT}$. Thus, the voltage level of the switching voltage $V_S$ is higher than $(V_{SS}-V_{D2})$ so that the dead-time detecting signal $S_{DN}$ outputted by the dead-time detecting circuit 400 represents "turning-off".

Figure 4:
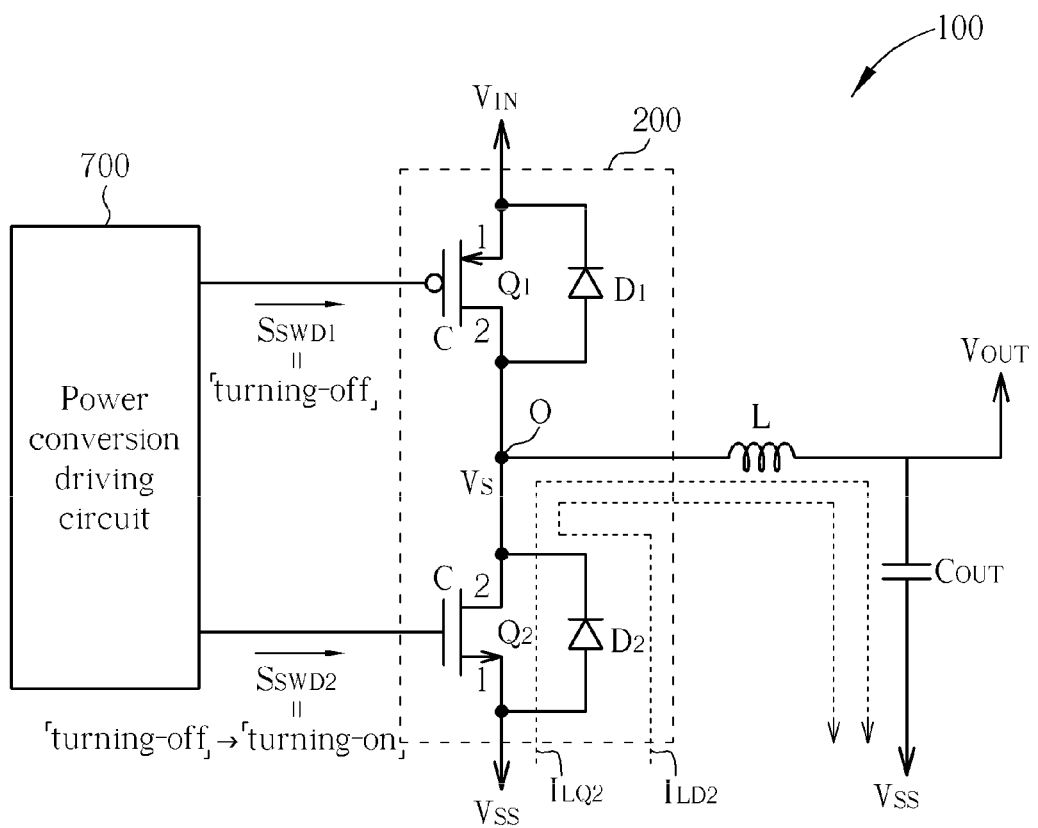
FIG. 4 is a diagram illustrating when the first power switch shown in FIG. 3 changes from turned-on to turned-off.

Please refer to FIG. 4, a diagram illustrating when the power switch $Q_1$ shown in FIG. 3 changes from turned-on to turned-off. Meanwhile, the set/reset signal $S_{S/R}$ represents "resetting" (high voltage level) so as to control the switch-driving signal representing "turning-off" (high voltage level). Meanwhile, the voltage polarity of the inductive load L reverses; the inductive load L drains a current $I_{LD2}$ from the voltage source $V_{SS}$ through the parasitic diode $D_2$ of the power switch $Q_2$ for maintaining the current passing through the inductive load L; and the power switch set 200 is in the dead-state. The voltage level of the switching voltage $V_S$ is equal to the voltage $V_{SS}$ (0 volt) deducting the forward voltage $V_{D2}$ of the parasitic diode $D_2$ (around 0.7 volt) at the time. Hence, the S-type latch 512 generates the control signal $S_{C1}$ representing the logic "0" according to the dead-time detecting signal $S_{DN}$ representing "turning-on" and the set/reset signal $S_{S/R}$ representing "resetting". The AND gate $AND_1$ outputs the switch signal $S_{SW2}$ representing the logic "0" so that the buffer 532 generates the switch-driving signal $S_{SWD2}$ representing "turning-on" (high voltage level) so as to turn on the power switch $Q_2$. When the power switch $Q_2$ is turned on, the inductive load L can drain a current $I_{LQ2}$ from the voltage source $V_{SS}$ through the power switch $Q_2$. Meanwhile, the forward voltage $V_{D2}$ of the parasitic diode $D_2$ is equal to the gate-drain voltage $V_{GD2}$ of the power switch $Q_2$ (around 0.2 volt). Therefore, the switching voltage $V_S$ is raised up to $(V_{SS}-V_{GD2})$ so that the dead-time detecting signal $S_{DN}$ changes to represent "turning-off", which does not affect the on/off states of the power switches $Q_1$ and $Q_2$.

Figure 5:
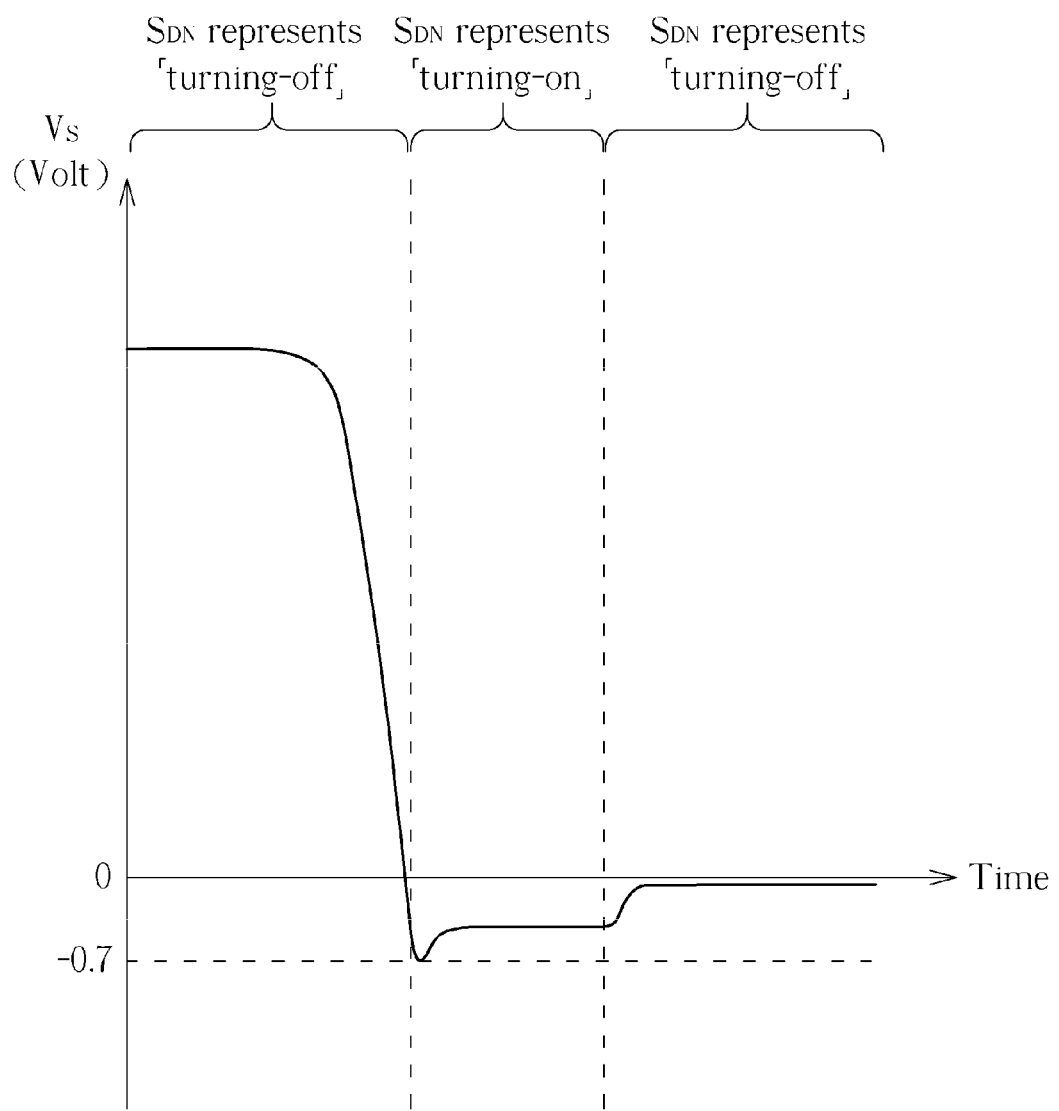
FIG. 5 is a diagram illustrating a change of a switching voltage when the first power switch changes from turned-on (in FIG. 3) to turned-off (in FIG. 4).

Please refer to FIG. 5. FIG. 5 is a diagram illustrating the change of the switching voltage $V_S$ when the power switch $Q_1$ changes from turned-on (in FIG. 3) to turned-off (in FIG. 4). At first, the power switch $Q_1$ is turned on and the power switch $Q_2$ is turned off. The voltage level of the switching voltage $V_S$ is between the input voltage $V_{IN}$ and the output voltage $V_{OUT}$. The switching voltage $V_L$ is higher that $(V_{SS}-V_{D2})$ at the time so that the transistor $Q_3$ of the dead-time detecting circuit 400 is turned off. As a result, the dead-time detecting signal $S_{DN}$ outputted by the dead-time detecting circuit 400 represents "turning-off" (low voltage level). When the power switch $Q_1$ is turned off, the inductive load L drains the current $I_{LD2}$ from the voltage source $V_{SS}$ through the parasitic diode $D_2$ of the power switch $Q_2$. Meanwhile, the switching voltage is equal to $(V_{SS}-V_{D2})$ so that the transistor $Q_3$ of the dead-time detecting circuit 400 is turned on. Hence, the dead-time detecting signal $S_{DN}$ outputted by the dead-time detecting circuit 400 represents "turning-on" (high voltage level). When the dead-time detecting signal $S_{DN}$ represents "turning-on", the S-type latch 512 turns on the power switch $Q_2$ through the AND gate $AND_1$ and the buffer 532 according to the dead-time detecting signal $S_{DN}$ representing "turning-on" and the set/reset signal $S_{S/R}$ representing "resetting". Meanwhile, the inductive load L drains the current $I_{LQ2}$ from the voltage source $V_{SS}$ through the power switch $Q_2$. The voltage level of the forward voltage $V_{D2}$ of the parasitic diode $D_2$ is equal to the source-drain voltage $V_{GD2}$ (around 0.2 volt). Thus, the switching voltage $V_S$ is raised up to $(V_{SS}-V_{GD2})$ so that the dead-time detecting signal $S_{DN}$ changes to represent "turning-off".

Figure 6:
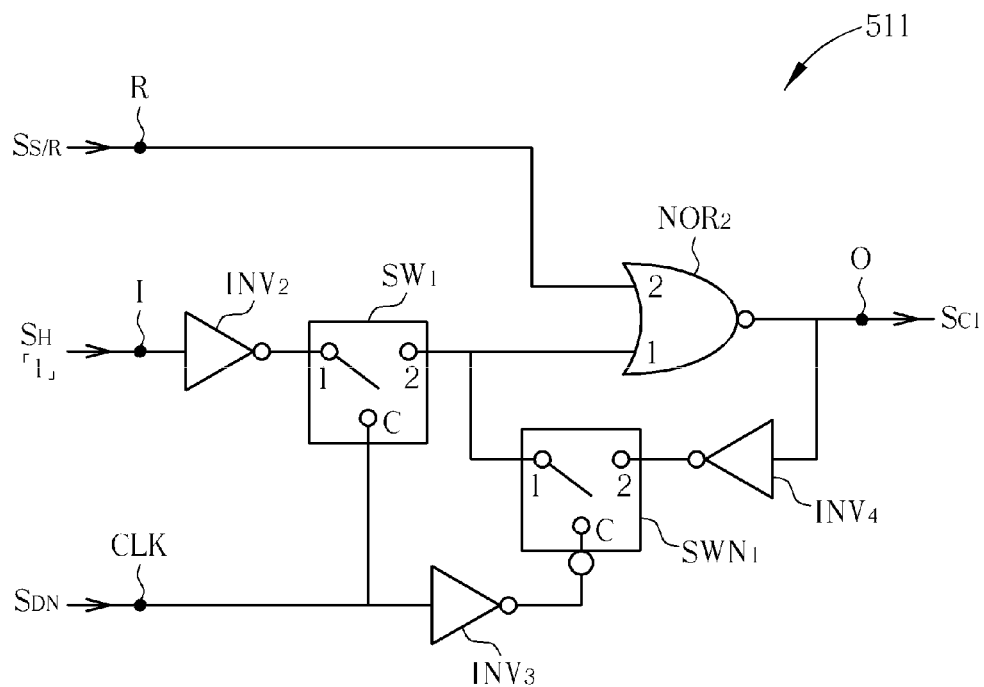
FIG. 6 is a diagram illustrating an R-type latch of the present invention.

Please refer to FIG. 6. The R-type latch 511 comprises three inverters $INV_2$, $INV_3$, and $INV_4$, a switch $SW_1$, an inverted switch $SWN_1$, and a NOR gate $NOR_2$. The coupling relation between the components of the R-type latch 511 and the truth table of the R-type latch 511 are shown in FIG. 6. The operation principle of the R-type latch 511 is well known to those skilled in the art, and hence will not be repeated again for brevity.

Figure 7:
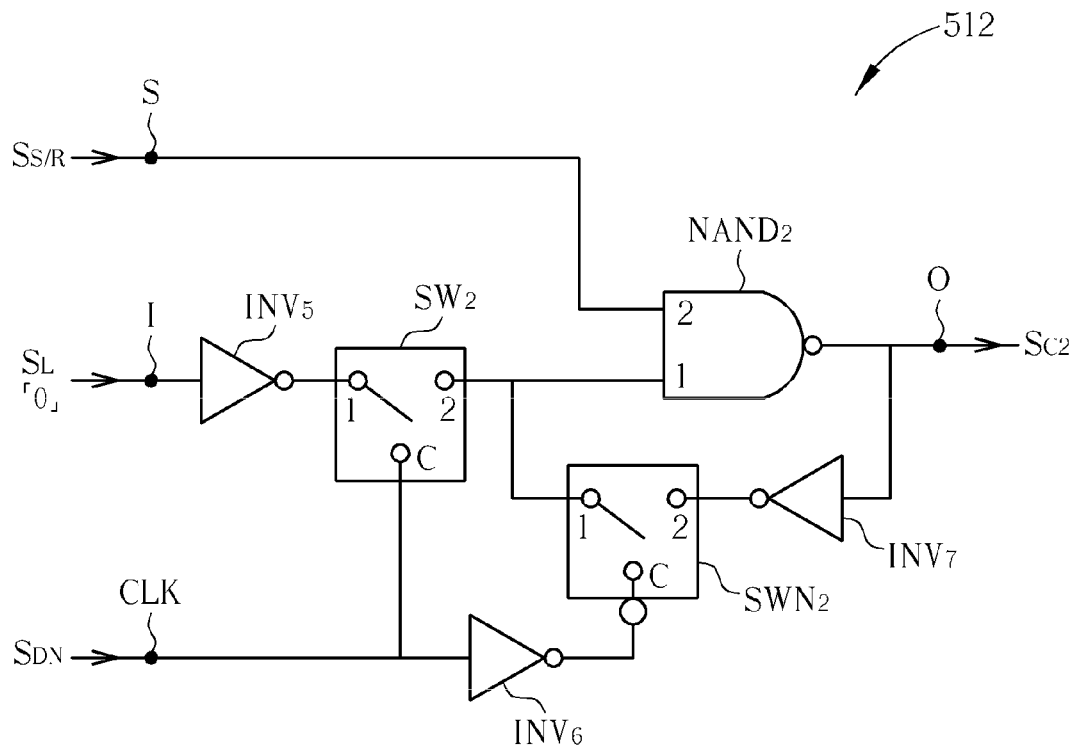
FIG. 7 is a diagram illustrating an S-type latch of the present invention.

Please refer to FIG. 7. The S-type latch 512 comprises three inverters $INV_5$, $INV_6$, and $INV_7$, a switch $SW_2$, an inverted switch $SWN_2$, and a NAND gate $NAND_2$. The coupling relation between the components of the S-type latch 512 and the truth table of the S-type latch 512 are shown in FIG. 7. The operation principle of the S-type latch 512 is well known to those skilled in the art, and hence will not be repeated again for brevity.

Figure 8:
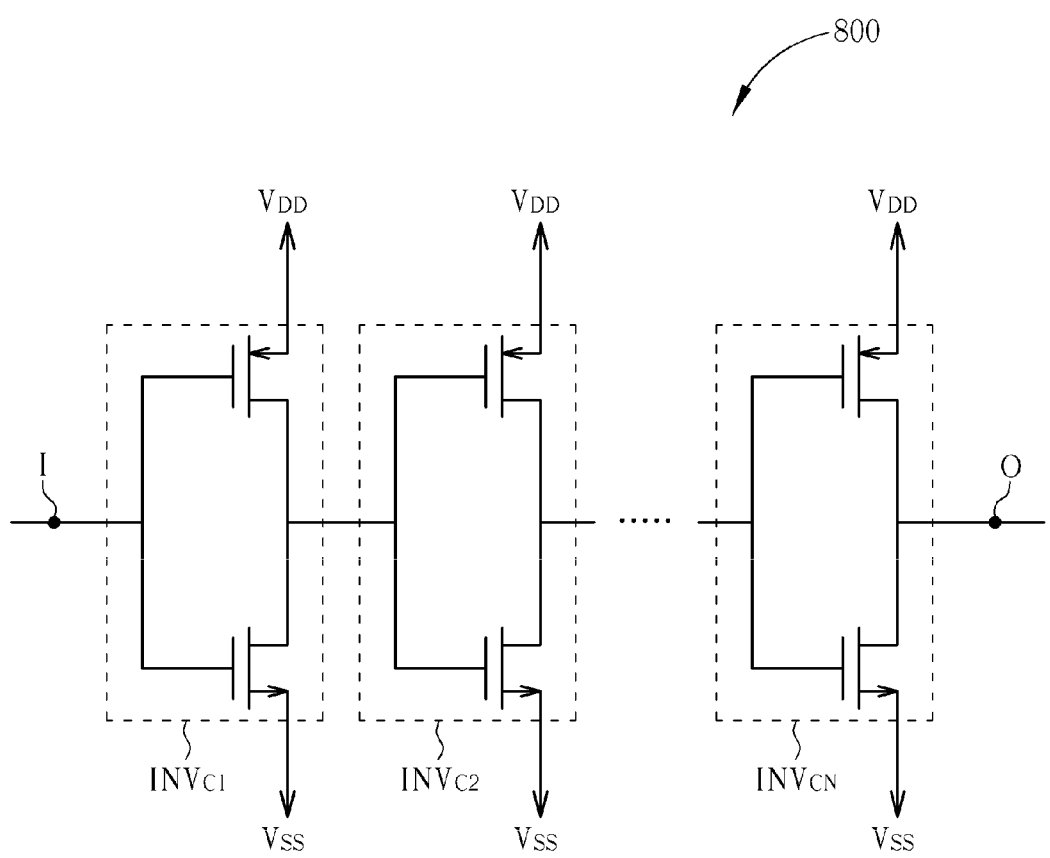
FIG. 8 is a diagram illustrating a buffer of the present invention.

Please refer to FIG. 8. FIG. 8 is a diagram illustrating a buffer 800 of the present invention. The buffer 800 can utilized as the buffers 531 or 532 of the buffer circuit 530. The buffer 800 comprises N inverters $INV_{C1}$~$INV_{CN}$ coupled in series, and N represents an odd integer. Each inverter is a Complementary Metal Oxide Semiconductor (CMOS) transistor, comprising a PMOS transistor and an NMOS transistor. The ratios of length to width of each CMOS transistor of the buffer 800 become larger in sequence for buffering. The signal inputted to the buffer 800 are inverted N times by the N inverters $INV_{C1}$~$INV_{CN}$. Since N is an odd integer, the logic of the output signal of the buffer 800 is inverted to the logic of the input signal of the buffer 800.

In conclusion, no matter the power converting system provided by the present invention operates in the CCM mode or in the DCM mode, the power converting system of the present invention can determine if the power switch set is in the dead-time state by means of the dead-time detecting circuit detecting the change of the switching voltage and the logic-calculating module detecting the change of the switch-driving signal. When the power switch set is in the dead-time state, the dead-time detecting circuit or the logic-calculating module controls the switch-controlling circuit to output the corresponding control signal for turning on the corresponding power switch in time, urging the power switch to be away from the dead-time state. In this way, the dead-time is reduced and the efficiency of the power converting system is improved, causing a great convenience.

Those skilled in the art will readily observe that numerous modifications and alterations of the device and method may be made while retaining the teachings of the invention.

What is claimed is:

1. A driving circuit with function of reducing dead-time, comprising:
   a dead-time detecting circuit coupled to an output of a power switch set, for detecting a switching voltage on the output of the power switch set and accordingly generating a dead-time detecting signal;
   wherein the output end of the power switch set is coupled to a first end of an inductive load;
   wherein a second end of the inductive load provides an output voltage;
   wherein the power switch set comprises:
   a first power switch having a first end coupled to a first voltage source, a second end coupled to the output end of the power switch set, and a control end for receiving a first switch-driving signal; and
   a second power switch having a first end coupled to a second voltage source, a second end coupled to the output end of the power switch set, and a control end for receiving a second switch-driving signal;
wherein when the first switch-driving signal represents turning-on, the first power switch is turned on;
wherein when the second switch-driving signal represents turning-on, the second power switch is turned on;
a duty-cycle controlling circuit coupled to the second end of the inductive load for generating a set/reset signal according to the output voltage; and
a switch-controlling circuit for changing the state of the power switch set from a dead-time state according to the set/reset signal and the dead-timed detecting signal, wherein the switch-controlling circuit comprises:
a latch circuit, comprising:
a first latch, for generating a first control signal according to a first logic signal, the set/reset signal, and the dead-time detecting signal;
wherein the first logic signal represents a first predetermined logic; and
a second latch, for generating a second control signal according to a second logic signal, the set/reset signal, and the dead-time detecting signal;
wherein the second logic signal represents a second predetermined logic;
a logic-calculating module, comprising:
a first logic-calculating circuit, for generating a first switch signal according to the set/reset signal, the first control signal, and the second switch-driving signal; and
a second logic-calculating circuit, for generating a second switch signal according to the set/reset signal, the second control signal, and the first switch-driving signal; and
a buffer circuit, comprising:
a first buffer, for generating the first switch-driving signal according to the first switch signal; and
a second buffer, for generating the second switch-driving signal according to the second switch signal;
wherein the first predetermined logic is different from the second predetermined logic.

2. The driving circuit of claim 1, wherein the first latch comprises:
an input end, for receiving the first logic signal;
a reset end, for receiving the set/reset signal;
a clock-controlling end, for receiving the dead-time detecting signal; and
an output end, for outputting the first control signal;
wherein when the set/reset signal represents resetting, the first control signal represents the second predetermined logic;
wherein when the set/reset signal represents setting and the dead-time detecting signal represents turning-off, the first control signal remains unchanged;
wherein when the set/reset signal represents setting and the dead-time detecting signal represents turning-on, the first control signal represents the first predetermined logic.

3. The driving circuit of claim 2, wherein the first latch further comprises:
a first inverter, an input end of the first inverter coupled to the input end of the first latch, for receiving the first logic signal;
a first switch, a first end of the first switch coupled to an output end of the first inverter, a control end of the first switch coupled to the clock-controlling end of the first latch for receiving the dead-time detecting signal;
wherein when the dead-time detecting signal represents turning-on, the first switch is turned on;
a second inverter, an input end of the second inverter coupled to the control end of the first switch for receiving the dead-time detecting signal;
a first inverted switch, a first end of the first inverted switch coupled to the second end of the first switch, a control end of the first inverted switch coupled to the output end of a second inverter;
wherein when the dead-time detecting signal represents turning-off, the first inverted switch is turned on;
a first logic gate, a first input end of the first logic gate coupled to an second end of the first switch and the first end of the first inverted switch, a second input end of the first logic gate coupled to the reset end of the first latch for receiving the set/reset signal, an output end of the first logic gate coupled to the output end of the first latch for outputting the first control signal;
wherein the first logic gate is a NOR gate; and
a third inverter, an input end of the third inverter coupled to the output end of the first logic gate for receiving the first control signal, an output end of the third inverter coupled to a second end of the first inverted switch.

4. The driving circuit of claim 1, wherein the second latch comprises:
an input end, for receiving the second logic signal;
a set end, for receiving the set/reset signal;
a clock-controlling end, for receiving the dead-time detecting signal; and
an output end, for outputting the second control signal;
wherein when the set/reset signal represents setting, the second control signal represents the first predetermined logic;
wherein when the set/reset signal represents resetting and the dead-time detecting signal represents turning-off, the second control signal remains unchanged;
wherein when the set/reset signal represents resetting and the dead-time detecting signal represents turning-on, the second control signal represents the second predetermined logic.

5. The driving circuit of claim 4, wherein the second latch further comprises:
a fourth inverter, an input end of the fourth inverter coupled to the input end of the second latch, for receiving the second logic signal;
a second switch, a first end of the second switch coupled to an output end of the fourth inverter, a control end of the second switch coupled to the clock-controlling end of the second latch for receiving the dead-time detecting signal;
wherein when the dead-time detecting signal represents turning-on, the second switch is turned on;
a fifth inverter, an input end of the fifth inverter coupled to the control end of the second switch for receiving the dead-time detecting signal;
a second inverted switch, a first end of the second inverted switch coupled to a second end of the second switch, a control end of the second inverted switch coupled to the output end of the fifth inverter;
wherein when the dead-time detecting signal represents turning-off, the second inverted switch is turned on;
a second logic gate, a first input end of the second logic gate coupled to a second end of the second switch and the first end of the second inverted switch, a second input end of the second logic gate coupled to the set end of the second latch for receiving the set/reset signal, an output end of the second logic gate coupled to the output end of the second latch for outputting the second control signal; wherein the second logic gate is a NAND gate; and
a sixth inverter, an input end of the sixth inverter coupled to the output end of the second logic gate for receiving the second control signal, an output end of the sixth inverter coupled to a second end of the second inverted switch.

6. The driving circuit of claim 1, wherein the first buffer comprises N seventh inverters coupled in series, for receiving the first switch signal and accordingly outputting the first switch-driving signal; the second buffer comprises N eighth inverters coupled in series, for receiving the second switch signal and accordingly outputting the second switch-driving signal; wherein N represents an odd integer.

7. The driving circuit of claim 1, further comprising:
a voltage divider, coupled between the second end of the inductive load and the second voltage source, for generating a feedback voltage according to the output voltage;
wherein the feedback voltage is provided to the duty-cycle controlling circuit for generating the set/reset signal.

8. The driving circuit of claim 7, wherein the duty-cycle controlling circuit comprises:
a duty-cycle controller, for generating a duty-cycle signal according to the feedback voltage; and
a ninth inverter, for generating the set/reset signal according to the duty-cycle signal.

9. The driving circuit of claim 1, wherein the first power switch is a PMOS transistor; the second power switch is an NMOS transistor.

10. A power converting system with function of reducing dead-time, comprising:
a power switch set coupled to an inductive load;
wherein the power switch set has a first power switch and a second power switch;
wherein the power switch set is controlled to be away from a dead-time state according to a first switch-driving signal and a second switch-driving signal;
a dead-time detecting circuit coupled to a first end of the inductive load, for detecting a switch voltage on the first end of the inductive load and accordingly generating a dead-time detecting signal;
a duty-cycle controlling circuit coupled to a second end of the inductive load, for generating a set/reset signal according to an output voltage of the power converting system; and
a switch-controlling circuit for generating the first switch-controlling signal and the second switch-controlling signal according to the set/reset signal and the dead-time detecting signal, wherein the switch-controlling circuit comprises:
a latch circuit, comprising:
a first latch, for generating a first control signal according to a first logic signal, the set/reset signal, and the dead-time detecting signal;
wherein the first logic signal represents a first predetermined logic; and
a second latch, for generating a second control signal according to a second logic signal, the set/reset signal, and the dead-time detecting signal;
wherein the second logic signal represents a second predetermined logic;
a logic-calculating module, comprising:
a first logic-calculating circuit, for generating a first switch signal according to the set/reset signal, the first control signal, and the second switch-driving signal; and a second logic-calculating circuit, for generating a second switch signal according to the set/reset signal, the second control signal, and the first switch-driving signal; and
a buffer circuit, comprising:
a first buffer, for generating the first switch-driving signal according to the first switch signal; and
a second buffer, for generating the second switch-driving signal according to the second switch signal;
wherein the first predetermined logic is different from the second predetermined logic.

11. The power converting system of claim 10, wherein the first buffer comprises N first inverters coupled in series, for receiving the first switch signal and accordingly outputting the first switch-driving signal; the second buffer comprises N second inverters coupled in series, for receiving the second switch signal and accordingly outputting the second switch-driving signal; wherein N represents an odd integer.

12. The power converting system of claim 11, further comprising:
a voltage divider, coupled between the second end of the inductive load and a second voltage source, for generating a feedback voltage according to the output voltage;
wherein the feedback voltage is provided to the duty-cycle controlling circuit for generating the set/reset signal.

13. The power converting system of claim 12, wherein the duty-cycle controlling circuit comprises:
a duty-cycle controller, for generating a duty-cycle signal according to the feedback voltage; and
a third inverter, for generating the set/reset signal according to the duty-cycle signal.

14. The power converting system of claim 13, wherein the first latch comprises:
a fourth inverter, an input end of the fourth inverter utilized for receiving the first logic signal;
a first switch, a first end of the first switch coupled to an output end of the fourth inverter, a control end of the first switch coupled to the dead-time detecting circuit for receiving the dead-time detecting signal;
wherein when the dead-time detecting signal represents turning-on, the first switch is turned on;
a fifth inverter, an input end of the second inverter coupled to the dead-time detecting circuit for receiving the dead-time detecting signal;
a first inverted switch, a first end of the first inverted switch coupled to a second end of the first switch, a control end of the first inverted switch coupled to the output end of a fifth inverter;
wherein when the dead-time detecting signal represents turning-off, the first inverted switch is turned on;
a first logic gate, a first input end of the first logic gate coupled to the second end of the first switch and the first end of the first inverted switch, a second input end of the first logic gate coupled to the third inverter for receiving the set/reset signal, an output end of the first logic gate utilized for outputting the first control signal;
wherein the first logic gate is a NOR gate; and
a sixth inverter, an input end of the sixth inverter coupled to the output end of the first logic gate for receiving the first control signal, an output end of the sixth inverter coupled to a second end of the first inverted switch.

15. The power converting system of claim 13, wherein the second latch comprises:
a seventh inverter, an input end of the seventh inverter utilized for receiving the second logic signal;

a second switch, a first end of the second switch coupled to an output end of the seventh inverter, a control end of the second switch coupled to the dead-time detecting circuit for receiving the dead-time detecting signal;
  wherein when the dead-time detecting signal represents turning-on, the second switch is turned on;
a eighth inverter, an input end of the eighth inverter coupled to the dead-time detecting circuit for receiving the dead-time detecting signal;
a second inverted switch, a first end of the second inverted switch coupled to a second end of the second switch, a control end of the second inverted switch coupled to the output end of the eighth inverter;
  wherein when the dead-time detecting signal represents turning-off, the second inverted switch is turned on;
a second logic gate, a first input end of the second logic gate coupled to the second end of the second switch and the first end of the second inverted switch, a second input end of the second logic gate coupled to the third inverter for receiving the set/reset signal, an output end of the second logic gate utilized for outputting the second control signal;
  wherein the second logic gate is a NAND gate; and
a ninth inverter, an input end of the ninth inverter coupled to the output end of the second logic gate for receiving the second control signal, an output end of the ninth inverter coupled to the second end of the second inverted switch.

16. The power converting system of claim 10, wherein the first power switch is a PMOS transistor; the second power switch is an NMOS transistor.

* * * * *